United States Patent
Ma

(10) Patent No.: US 6,740,452 B2
(45) Date of Patent: May 25, 2004

(54) PROCESS OF FORMING A NEGATIVE BATTERY PASTE

(75) Inventor: Daxing Ma, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 214 days.

(21) Appl. No.: 10/102,451

(22) Filed: Mar. 19, 2002

(65) Prior Publication Data

US 2003/0180613 A1 Sep. 25, 2003

(51) Int. Cl.$^7$ ............................. H01M 4/56; H01M 4/62
(52) U.S. Cl. ...................... 429/228; 429/215; 29/623.5; 141/1.1
(58) Field of Search ....................... 252/182.1; 429/228, 429/215, 204; 141/1.1; 29/623.5

(56) References Cited

U.S. PATENT DOCUMENTS

| | | | | |
|---|---|---|---|---|
| 944,822 A | * | 12/1909 | Rodman | ..................... 429/215 |
| 2,644,023 A | * | 6/1953 | Rasch | ......................... 429/215 |
| 6,203,943 B1 | * | 3/2001 | Bennett et al. | ............. 429/215 |
| 6,346,347 B1 | * | 2/2002 | McNally et al. | ............ 429/215 |
| 6,454,977 B1 | | 9/2002 | Kwok et al. | |

FOREIGN PATENT DOCUMENTS

JP   6018262   *   9/1985

* cited by examiner

*Primary Examiner*—John S. Maples
(74) *Attorney, Agent, or Firm*—Jimmy L. Funke

(57) ABSTRACT

Provided for herein is a process of forming a negative battery paste comprising combining a barium containing material at least partially dissolved in a portion of water with an organic expander, carbon black, and a lead oxide containing material to form a first mixture, followed by combining the first mixture with an amount of sulfuric acid to form the negative battery paste.

17 Claims, 1 Drawing Sheet

PROCESS OF FORMING A NEGATIVE BATTERY PASTE

BACKGROUND OF THE INVENTION

Electrochemical storage batteries, and in particular, lead sulfuric acid storage batteries are ubiquitous in automotive applications. These batteries have electrochemical cells developing about 2.25 Volts each. A generic lead acid battery cell has a positive plate, a negative plate, and an electrolyte, typically aqueous sulfuric acid. The plates are held in a parallel orientation and electrically isolated by a porous separator to allow free movement of charged ions. Generally, six of these cells are connected in series to produce the 12 Volts (12 V) common in automobile systems.

The positive battery plate (also known as a positive electrode) contains a current collector (i.e., a metal plate or grid, hereinafter grid), covered with a layer of positive active material (hereinafter PAM) on the surface. PAM is essentially all electrically conductive lead dioxide ($PbO_2$). The negative battery plate contains a current collector (grid), and it is covered with a negative active material, typically lead metal referred to in the art as "spongy lead."

Lead acid battery cells are quite unique because the electrolyte actively participates in the energy storage and release process, as represented schematically in Equations 1, 2, 3, and 4 below:

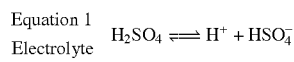

Equation 1
Electrolyte $H_2SO_4 \rightleftharpoons H^+ + HSO_4^-$

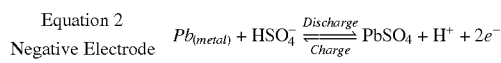

Equation 2
Negative Electrode $Pb_{(metal)} + HSO_4^- \underset{Charge}{\overset{Discharge}{\rightleftharpoons}} PbSO_4 + H^+ + 2e^-$

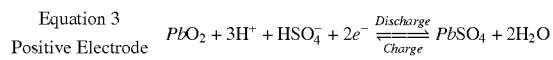

Equation 3
Positive Electrode $PbO_2 + 3H^+ + HSO_4^- + 2e^- \underset{Charge}{\overset{Discharge}{\rightleftharpoons}} PbSO_4 + 2H_2O$

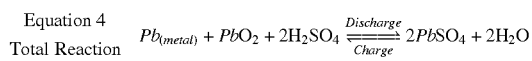

Equation 4
Total Reaction $Pb_{(metal)} + PbO_2 + 2H_2SO_4 \underset{Charge}{\overset{Discharge}{\rightleftharpoons}} 2PbSO_4 + 2H_2O$ Discharge within the electrochemical cell results in lead metal (Pb) supplied by the negative plate reacting with the ionized sulfuric acid electrolyte to form lead sulfate ($PbSO_4$) on the surface of the negative plate (see Equation 2). Discharge also results in the $PbO_2$ located on the positive plate being converted into $PbSO_4$ on or near the positive plate. Charging of the battery cell (via an electron supply from an external electrical current) converts $PbSO_4$ into spongy lead metal on the surface of the negative plate, and converts $PbSO_4$ into $PbO_2$ (PAM) on the surface of the positive plate. In effect, charging converts $PbSO_4$ into PAM and lead metal; discharging releases the stored electrical potential by converting PAM and lead metal back into PbSO4.

Lead acid batteries, to function properly, require the negative electrode to remain porous. However, the surface of the spongy lead on the negative plate can become covered by an impenetrable film of lead sulfate that forms during discharge. This film "pacifies" the spongy lead by forming a film over the negative active material (known in the art as "sintering"). Accordingly, an expander is added in small amounts to the negative active material to prevent the contraction and solidification of the spongy lead of the negative plate and thus preventing the contraction or the closing of the pores in the negative plate. Expanders are typically acid resistant materials able to function in the presence of the sulfuric acid electrolyte.

The common process to manufacture lead acid battery plates includes pasting (i.e., preparing a suitable paste and applying the paste to a grid), followed by curing and forming steps, in which the active materials are converted from the paste applied to the grids. The paste applied to the grids typically includes the combination of dry powders, sulfuric acid, and water. To maximize the utilization of negative plates, the paste must be uniform in both composition and consistency. To be evenly applied to the grids, the powders used to make the paste must have a pre-defined particle size distribution and the paste cannot contain either an insufficient or an excess of water. Of particular significance is the uniform distribution of the expander in the negative paste, which must be evenly distributed once applied to the surface of the grid.

To produce a uniform paste, the materials are mixed typically in a batch type operation and then applied to the grids. However, a batch type operation is not as efficient as a continuous process would be. As such, a method of making a uniform paste from a material that eliminates at least some of the mixing of powdered materials used to form the paste is desirable, as is the use of such materials wherein paste is made and applied to grids in a continuous process.

SUMMARY OF THE INVENTION

Provided for herein is a process of forming a negative battery paste including combining a barium containing material at least partially dissolved in water with an organic expander, carbon black, and a lead oxide containing material to form a first mixture; followed by combining the first mixture with an amount of sulfuric acid to form the negative battery paste.

BRIEF DESCRIPTION OF THE DRAWINGS

The improved electrode will now be described, by way of example, with reference to the accompanying drawings, which are meant to be exemplary, not limiting, and wherein like elements are numbered alike in several figures.

DETAILED DESCRIPTION

Figure 1:
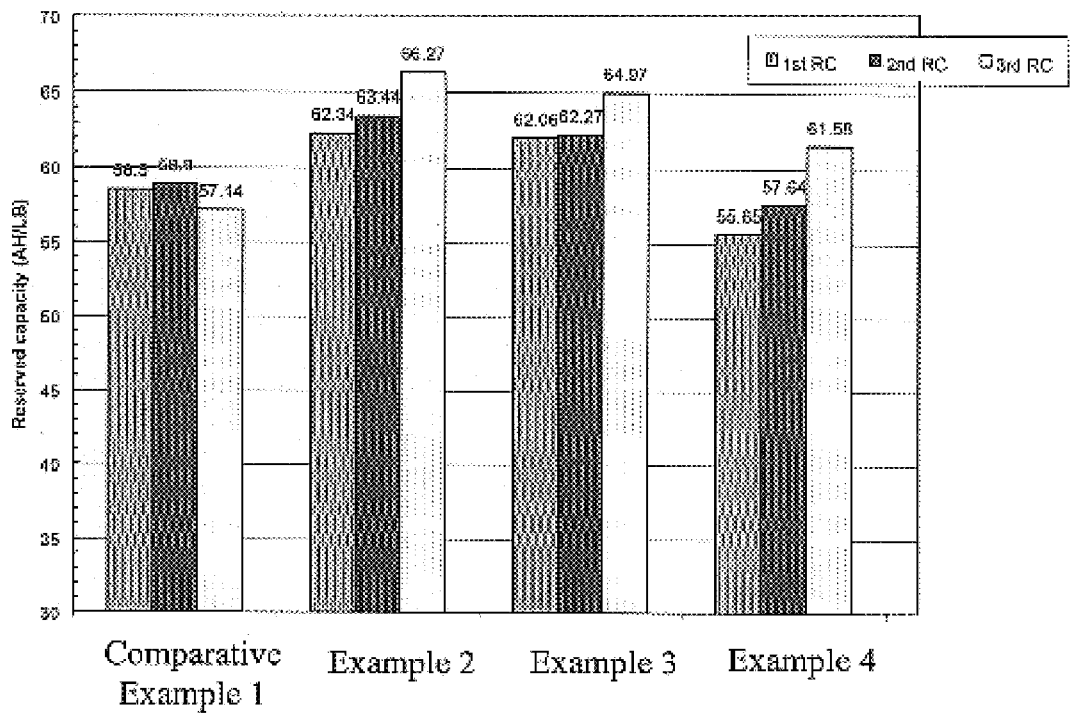
FIG. 1 is a graphical representation of Initial Capacity testing.
Figure 2:
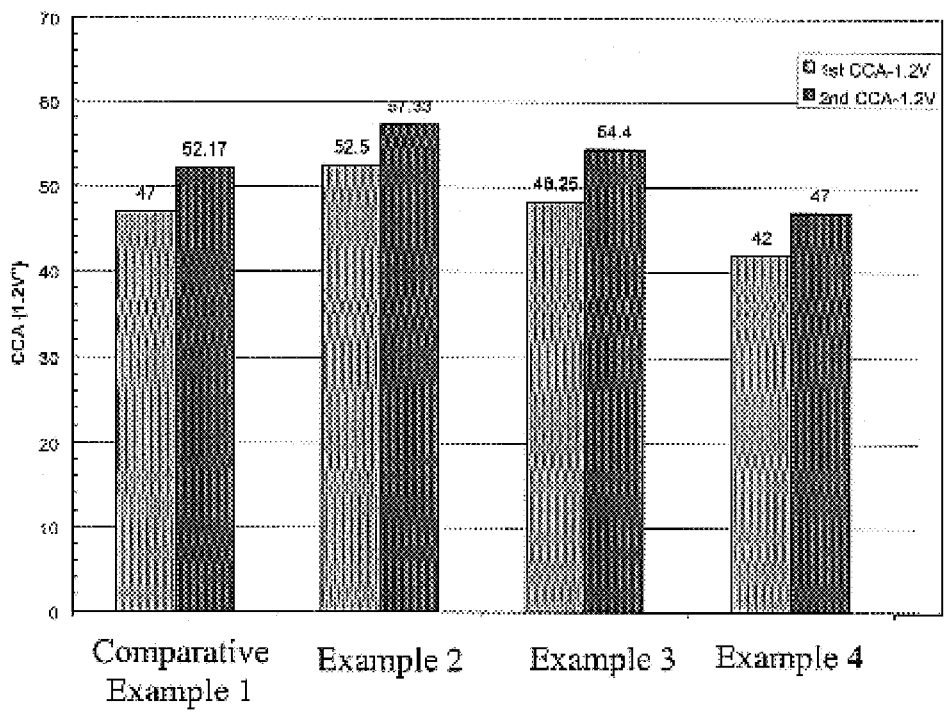
FIG. 2 is a graphical representation of High Rate Discharge testing.

It has been discovered that a negative battery plate paste can be formed in part from water dispersible and/or water soluble materials to produce a more uniform paste, consistent with a continuous application of the paste to a battery grid that results in an improved negative battery plate.

Negative plate paste is prepared from lead oxide, sulfuric acid, water and suitable expanders. A suitable expander material typically comprises a mixture of an organic expander, carbon black, and barium sulfate. Although the exact mechanism of the expander has not been quantitatively determined, it is believed that each of the additives has certain functions once applied to the negative plate. For example, it is believed that the lignin sulfonic acid, including its synthetically derived analogs, somehow changes the crystal growth of lead sulfate formed during discharge of the battery such that the lead sulfate does not form a continuous film over the surface of the spongy lead. This allows for a discontinuous structure of spongy lead in contact with the sulfuric acid electrolyte, and thus production of electrical energy from the battery. It has also been discovered that without an organic expander, particularly, for example, the sulfonate derivatives of lignin or their equivalent, lead crystals become quite large in diameter and cover the plate and result in low capacity and poor cycle battery life. It is also believed that carbon, being moderately electrically conductive, assists in the formation of spongy lead. Furthermore, it is believed that barium, typically barium sulfate, which morphologically resembles lead sulfate, allows lead sulfate to form more efficiently during battery discharge conditions, thus preventing or reducing sintering of the spongy lead. This in-turn enhances battery performance.

The improvement herein results from utilizing water soluble and/or water dispersible materials in the steps required to produce the paste. By water soluble and/or water dispersible, it is meant a material having at least a 0.5% by weight solubility in water, or a material which readily forms a dispersion in water upon simple mixing. It can also mean a material readily "wet" by water such that a material in contact with the water becomes evenly distributed upon mixing. Specifically, water soluble and/or water dispersible forms of barium containing materials are used herein, dissolved in a portion of the water used to make the paste. This water is then mixed with lead oxide powder and other non-soluble/non-dispersible paste materials to form a first mixture. Upon addition of sulfuric acid to this mixture, the barium precipitates as barium sulfate. This barium sulfate formed by this procedure is evenly distributed throughout the paste. As such, the amount of mixing to form a uniform past by this method is less than the mixing required to form a paste from barium sulfate, and other non-water soluble materials that have been added in dry form and then mixed into a paste with liquid. In addition to a more uniform paste, the reduction in mixing required to produce the final negative paste allows for a continuous process of paste formation and application to be used.

The barium source is present in the mixture at a concentration at least about 0.1%, preferably at least about 0.5%, with a concentration at least about 1% based upon the total lead oxide used to form the final paste being more preferred. Also, the barium source is present at a concentration of at most about 10%, preferably at most about 5%, with a concentration at most about 3% based upon the total lead oxide used to form the final paste being more preferred.

The organic expander useful herein is either liquid phase or powder phase and is present at a concentration of at least about 0.1%, preferably at least about 0.5%, with a concentration of at least about 1% based upon the total lead oxide used to form the final paste being more preferred. Also, the organic expander is present at a concentration at most about 10%, preferably at most about 5%, with a concentration at most about 3% based upon the total leady oxide used to form the final paste being more preferred.

Suitable sulfonate derivatives of lignin and their synthetic organic analogs will have surfactant properties which allow the lignin derivative to be absorbed onto the spongy lead, as well as on the surface of the lead sulfate crystals formed during discharge. By surfactant properties, it is meant the surface tension of an aqueous solution of the material is lower than water alone. It is believed that these properties inhibit crystal growth during the dissolution-precipitation process.

To produced a more uniform paste, preferably the sulfonate derivatives of lignin are water soluble or water dispersible, having a molecular weight at least about 10,000 g/mol, preferably at least about 20,000 g/mole with a molecular weight of at least about 30,000 g/mol being most preferred. Also, the sulfonate derivatives of lignin have a molecular weight at most about 100,000 g/mol, preferably at most about 80,000 g/mole with a molecular weight of at most about 50,000 g/mol being most preferred.

The carbon black is preferably a finely divided powder, substantially free from all oil or tar. Preferably, the carbon black is dispersible in water and/or wettable by the sulfuric acid electrolyte in the presence of a suitable surfactant. Preferably, the carbon black is readily dispersed in water by simple mixing or agitation. The carbon black has an average particle size at least about 110 nanometers $(nm)_1$ and less than about 330 nm. The carbon black is present at a concentration at least about 0.1%, preferably at least about 0.5%, with a concentration of at least about 1% based upon the total lead oxide used to form the final paste being more preferred. Also, the carbon black is present at a concentration at most about 10%, preferably at most about 5%, with a concentration at most about 3% based upon the total lead oxide used to form the final paste being more preferred.

In addition, various binders that improve handling characteristics can be incorporated into the negative battery paste including suitable fibers such as, for example, fiberglass, carbon fibers, synthetic plastic fibers including acrylic fibers, conductive ceramics, mixtures containing at least one of the foregoing, and the like.

The concentration of the total expander mixture, which contains the barium material, the organic expander, and the carbon black, as well as other additives is determined as weight percent based on the total weight of the lead oxide present in the paste. The total expander mixture is present at a concentration at least about 1%, preferably at least about 2%, with a concentration of at least about 3% by weight based upon the total weight of lead oxide used to form the final paste being more preferred. Also, the total expander mixture is typically present at a concentration at most about 30%, preferably at most about 10%, with a concentration at most about 5% based upon the total leady oxide used to form the final paste being more preferred.

Because the expander can be suitably mixed with the lead oxide containing material prior to addition of sulfuric acid, a batch process is no longer needed to ensure adequate mixing of the expander within the paste. Accordingly, a continuous process becomes possible, which includes the combination and mixing of the expander, in water, followed by mixing with lead oxide containing material and other processing aids as described above. At some point in the process, sulfuric acid is added to precipitate the $BaSO_4$, followed by mixing to form the final paste. Once formed, the paste is then applied to the grids in a continuous process. Examples of this process include:

Mixing lignosulfonate (solid), carbon black (solid) and lead oxide with a required amount of water having barium hydroxide dissolved within; or dissolving barium hydroxide in small portion of the required amount of water then adding to the lead oxide; followed by adding sulfuric acid, which will precipitate the barium as $BaSO_4$, and mixing for a period of time sufficient to produce a uniform negative paste.

Also included is the mixing of carbon black (solid) and lead oxide with a required amount of water having barium hydroxide and lignosulfonate that are liquid dispersed, contained within; or dissolve barium hydroxide and liquid lignosulfonate in small portion of the required amount of water then adding to lead oxide, finally adding sulfuric acid and mixing for a period of time sufficient to produce a uniform negative paste.

In addition, mixing lead oxide with required amount of water having barium hydroxide, lignosulfonate, and carbon dispersed within the water; or dissolving barium hydroxide, lignosulfonate, and carbon dispersion in small portion of the required amount of water then adding to lead oxide, followed by addition of sulfuric acid and mixing for a period of time sufficient to produce a uniform negative paste.

Parameters used to evaluate negative plates are known in the art as the Battery Council International (BCI) initial sequence testing and include initial capacity and high rate discharge testing. These tests required the plates to first be assembled into a test cell having two positive plates and one negative plate. The cell was then "formed" into a battery having a full charge (e.g. 2.67 V according to test protocol). The cells were then discharged at a 3.5 amp load to determine the initial capacity of the cell, by measuring the time required to reach the "cutting voltage" of 1.75V. The cells were then recharged back with a 3.5 amp current at 2.67V for 24 hours; followed by maintaining them at a temperature of −18.7° C. for 24 hours. The high rate discharge was then evaluated by the cells being discharged at a 100 amp load to measuring the time required for the cell to reach the "cut voltage" of 1.2V. The cells were then again recharged back at 3.5 A to a potential of 2.67V for 24 hours and again discharged at 3.5 amps to determine the cells reserve capacity. These tests were conducted with comparative examples plates and plates made from the above described process.

The following examples are presented in order that those skilled in the art may better understand how to practice the present invention. These examples are merely presented by way of illustration only, and are not intended to limit the invention thereto.

EXAMPLES

In the examples that follow, the percent of material added represents the weight percent of the material based on the total amount of lead oxide present in the final paste.

Comparative Example 1

A negative battery paste was prepared by mixing 100% lead oxide, 13.77% water, 0.04% polypropylene fiber, and 1% expander in a mix pot for ten minutes then adding 6.20% sulfuric acid (50% concentration) to the pot with mixing for another twelve to fifteen minutes. The temperature reached between about 50° C.–60° C. The expander contained 0.25% lignosulfonate, 0.15% carbon black, and 0.6% barium sulfate. The paste was applied to a lead alloy grid, followed by curing of the grid at 40–60° C. for forty eight to seventy two hours. The cured grid was then assembled into a test cell and formed into a battery as described above. The results of the test are shown graphically in FIG. 1.

Example 2

0.25% lignosulfonate (solid), 0.15% carbon black (solid) 0.04% fiber, and 100% lead oxide were mixed for ten minutes with 13.77% water having 0.8% barium hydroxide dissolved within.

6.20% sulfuric acid (50% concentration) was then added and mixed for fifteen minutes. The paste temperature reached around 50–60° C. A uniform negative paste was produced. The paste was applied to a lead alloy grid, followed by curing of the grid at 40–50° C. for forty eight to seventy two hours. The cured grid was then assembled into a test cell and formed into a battery as described above. The results of the test are shown graphically in FIG. 1.

Example 3

0.15% carbon black (solid), 0.04% fiber, and 100% lead oxide were mixed for ten minutes with 13.77% water having 0.8% barium hydroxide and 0.6% lignosulfonate (dispersed solid) dissolved within.

6.20% sulfuric acid (50% concentration) was then added and mixed another twelve to fifteen minutes to produce a uniform negative paste. The paste was applied to a lead alloy grid, followed by curing of the grid at 40–50° C. for forty eight to seventy two hours. The cured grid was then assembled into a test cell and formed into a battery as described above. The results of the test are shown graphically in FIG. 1.

Example 4

100% lead oxide was mixed for ten minutes with 0.04% fiber and 13.77% water having 0.8% barium hydroxide, 0.83% carbon black (dispersed solid), and 0.6% lignosulfonate (dispersed solid) dissolved within 6.2% sulfuric acid (50% concentration) was then added and mixing for a twelve to fifteen minutes to produce a uniform negative paste. The paste was applied to a lead alloy grid, followed by curing of the grid at 40–50° C. for forty eight to seventy two hours. The cured grid was then assembled into a test cell and formed into a battery as described above. The results of the test are shown graphically in FIG. 1.

ANALYSIS OF DATA

As the data clearly shows, the initial capacity and high rate discharge of the plates produced according to the process described herein provide superior reserved capacity and high rate discharge capacity than did the comparative example.

With barium hydroxide in the negative plates (example 2 and 3), the reserved capacity was increased by 6% for the first test and 16% for the third test, respectively. The high rate capacity test was also improved by 10%. The mechanisms of barium hydroxide on improvements of battery capacity are believed to result from barium hydroxide being converted to barium sulfate (crystal seeds for lead sulfate) with lead sulfate simultaneously during the paste mixing and plate pickling processes. Barium sulfate could be evenly distributed in the negative plates, and lead sulfate would be produced more effectively, resulting in the smaller crystal size of lead sulfate and more surface area of active material-sponge lead after the plates are formed. The more surface area of the plate active material, the more capacity the battery can deliver along with a longer cycle life. The lower first and second reserved capacitates tested and the high rate capacity of example 4, as compared to the comparative example, was also a result of the surfactant used to better disperse the carbon.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. A process of forming a negative battery paste comprising:

combining a barium containing material at least partially dissolved in a portion of water with an organic expander, carbon black, and a lead oxide containing material to form a first mixture, followed by combining said first mixture with an amount of sulfuric acid to form said negative battery paste.

2. The process of claim 1, wherein said barium containing compound is barium hydroxide.

3. The process of claim 1, wherein said organic expander is a sulfonated derivative of lignin, or a synthetic organic analog thereof.

4. The process of claim 3, wherein said sulfonated derivative of lignin, or said synthetic organic analog thereof has a molecular weight at least about 10,000 g/mol, and at most about 100,000 g/mol.

5. The process of claim 3, wherein said sulfonated derivative of lignin, or said synthetic organic analog thereof is at least partially water soluble or water dispersible.

6. The process of claim 1, wherein said organic expander is present in said negative battery paste at least about 0.1 percent by weight, and at most about 10 percent by weight based on the total weight of lead oxide present in said negative battery paste.

7. The process of claim 1, wherein said carbon black is water dispersible.

8. The process of claim 1, wherein said carbon black has an average particle size less than about 330 nanometers (nm), and greater than about 110 nm.

9. The process of claim 1, wherein said carbon black is present in said negative battery paste at least about 0.1 percent by weight, and at most about 10 percent by weight based on the total weight of lead oxide present in said negative battery paste.

10. The process of claim 1, wherein said barium containing material is present in said negative battery paste at least about 0.1 percent by weight, and at most about 10 percent by weight based on the total weight of lead oxide present in said negative battery paste.

11. The process of claim 1, wherein said lead oxide containing material further contains lead metal.

12. The process of claim 1, wherein said lead oxide containing material has an average particle size less than about 5 microns.

13. The process of claim 1, wherein a total amount of said barium containing material, said organic expander, and said carbon black is present in said negative battery paste in an amount of at least about 0.2 percent by weight, and at most about 1.5 percent by weight based on the total weight of said lead oxide containing material.

14. The process of claim 1, wherein said barium containing material is present in said negative battery paste as barium sulfate after addition of said sulfuric acid to said first mixture.

15. The process of claim 1, wherein said barium containing material is mixed so as to be substantially uniformly dispersed throughout said first mixture.

16. The process of claim 14, wherein said negative battery paste is mixed such that said barium sulfate is substantially uniformly dispersed throughout said negative battery paste.

17. The process of claim 1, further comprising fibers, ceramics, or a combination comprising at least one of the foregoing.

* * * * *